(12) United States Patent
Takahashi (10) Patent No.: US 7,950,501 B2
(45) Date of Patent: May 31, 2011

(54) STOPPER FOR PREVENTING MOVEMENT OF A BAG EQUIPPED WITH CASTERS

(75) Inventor: Makoto Takahashi, Osaka (JP)

(73) Assignee: Ace Luggage Co., Ltd., Osaka (JP)

( * ) Notice: Subject to any disclaimer, the term of this patent is extended or adjusted under 35 U.S.C. 154(b) by 943 days.

(21) Appl. No.: 11/896,185

(22) Filed: Aug. 30, 2007

(65) Prior Publication Data

US 2008/0136133 A1    Jun. 12, 2008

(30) Foreign Application Priority Data

Dec. 12, 2006   (JP) .................................. 2006-334050

(51) Int. Cl.
*B60T 1/14* (2006.01)
(52) U.S. Cl. .................. 188/5; 188/7; 190/100
(58) Field of Classification Search .................. 188/5, 7, 188/19, 20, 32; 190/18 A, 100
See application file for complete search history.

(56) References Cited

U.S. PATENT DOCUMENTS

| | | | | |
|---|---|---|---|---|
| 4,020,959 A | * | 5/1977 | Livesay | 414/508 |
| 4,073,369 A | * | 2/1978 | Nordskog | 188/5 |

FOREIGN PATENT DOCUMENTS

| | | |
|---|---|---|
| JP | 11-192805 | 7/1999 |
| JP | B2-3551811 | 9/2000 |

* cited by examiner

*Primary Examiner* — Pam Rodriguez
(74) *Attorney, Agent, or Firm* — Posz Law Group, PLC (57) ABSTRACT

A stopper for preventing movement of a bag equipped with casters containing a base mounted on the bag bottom; a swingable member having one end portion rotatably connected to the base, and having the other end portion capable of being manipulated so as to swing the swingable member between a housing position where the other end portion is positioned close to the base and an engagement position for engaging the other end portion with the ground; a first link having one end portion rotatably connected to the swingable member, and having the other end portion rotatably and slidably connected to the base and slidable along the base bottom and a second link having one end portion rotatably connected to the other end portion of the first link, and constructed so as to be slidable with the other end portion of the first link along the base bottom.

5 Claims, 5 Drawing Sheets

STOPPER FOR PREVENTING MOVEMENT OF A BAG EQUIPPED WITH CASTERS

TECHNICAL FIELD

The present invention relates to a stopper for preventing movement of a bag equipped with casters.

BACKGROUND ART

Various stoppers for securing rockers, tables and like furniture equipped with casters on the bottoms thereof and thereby preventing movement from a desired position have been proposed. For example, Japanese Unexamined Patent Publication No. H11-192805 describes a stopper which is provided with a fixing support leg configured to be movable in the upward and downward directions between the ground and the bottom surface of a rocker or other item equipped with casters. The fixing support leg is brought into contact with the ground by pressing downwardly a fixing lever connected to the upper portion of the fixing support leg, thereby preventing the rocker or other item from moving.

Japanese Patent No. 3551811 describes a table having a ground-contact leg extending parallel to the ground and having casters mounted on both ends thereof. This table is prevented from moving by using a stopper accommodated inside the ground-contact leg. The stopper comprises: an inclining member capable of swinging around a rotation axis; and a ground-contact member attached to the tip of the inclining member and housed inside the ground-contact leg. The ground-contact member protrudes from the bottom surface of the ground-contact leg in response to a swinging movement of the inclining member and comes into contact with the ground, thereby preventing the table from moving. A manipulation member is provided swingably around a rotation axis above the inclining member. By pressing downward one end of the manipulation member that can be manipulated through an opening provided in the upper portion of the ground-contact leg, the inclining member is pressed downward and swung.

In the stopper for preventing movement described in Japanese Unexamined Patent Publication No. H11-192805, the fixing lever and the fixing support leg are disposed one above the other in such a manner that the fixing lever can press downward the fixing support leg from above. Therefore, even when the fixing support leg is raised from the ground in order to allow a rocker or other item to move, the fixing support leg greatly protrudes from the bottom surface of the rocker or other item. If there is a projection or the like on the ground, the fixing support leg collides with such a projection, so that the rocker or other item cannot move smoothly.

In contrast, according to the stopper for preventing movement described in Japanese Patent No. 3551811, because the ground-contact member is housed inside the ground-contact leg, the table can move smoothly even if there is a projection or the like on the ground. However, because the manipulation member and the inclining member are disposed one above the other, a large space in the height direction is required.

The stopper for preventing movement according to the present invention is used for a bag equipped with casters. When the stopper of Japanese Unexamined Patent Publication No. H11-192805 is applied to a bag equipped with casters, the bag cannot move smoothly if there is a projection or the like on the ground, as described above. When the stopper of Japanese Patent No. 3551811 is applied to a bag equipped with casters, smooth movement is possible, but the stopper occupies a part of storage space in the bag, thus resulting in reduced storage space. Furthermore, when the stopper of Japanese Patent No. 3551811, which is configured in such a manner that the manipulation member can be manipulated through an opening provided in the upper portion of the ground-contact leg, is applied to a bag equipped with casters, it becomes necessary to manipulate the manipulation member from inside the bag, thus resulting in awkward manipulation.

DISCLOSURE OF THE INVENTION

The present invention has been made to solve the above problems. An object of the present invention is to provide a stopper for preventing movement of a bag equipped with casters, the stopper not reducing the storage space of the bag, being easy to manipulate, and allowing the bag to smoothly move when desired.

The stopper for preventing movement of a bag equipped with casters according to the present invention has been invented to solve the above problems. The stopper comprises: a base mounted on the bottom surface of the bag; a swingable member having one end portion rotatably connected to the base, and having the other end portion capable of being manipulated so as to swing the swingable member between a housing position where the other end portion is positioned close to the base and an engagement position for engaging the other end portion with the ground; a first link having one end portion rotatably connected to the swingable member, and having the other end portion rotatably and slidably connected to the base and slidable along the bottom surface of the base in response to the swinging movement of the swingable member; and a second link having one end portion rotatably connected to the other end portion of the first link, and constructed so as to be slidable with the other end portion of the first link along the bottom surface of the base, the second link having an engaging portion. The base has an engaged portion which is engaged with the engaging portion of the second link to maintain the swingable member in the engagement position. The engagement between the engaging portion and the engaged portion can be released by manipulating the other end of the second link. When the swingable member is in the engagement position, the other end of the second link is positioned in an advanced position enabling the engagement release manipulation. When the swingable member is in the housing position, the other end portion of the second link is positioned in a retracted position and hidden by the base, whereas the swingable member and the first link are positioned along the bottom surface of the base.

With the above construction, because the stopper for preventing movement is mounted on the bottom surface of a bag equipped with casters, the storage space of the bag is not reduced.

Furthermore, because the swingable member for engagement with the ground is configured to be swung by manipulation, a manipulation member separately formed from a ground contact member, which is required in the above-mentioned prior art stopper, is unnecessary. Furthermore, because the swingable member is moved by a swinging movement, the swingable member is positioned along the bottom surface of the bag when it is in the housing position. Furthermore, because one end portion of the first link is rotatable and the other end portion thereof is connected rotatably and slidably, the first link swings in response to the swinging movement of the swingable member. Accordingly, when the swingable member is in the housing position, the first link is positioned along the bottom of the bag, so that the amount of projection of the stopper from the bottom of the bag is small. Therefore, even if there is a projection or the like on the ground, the stopper is less likely to collide with such a projection, and the bag can be moved smoothly.

With the above construction, the swingable member is configured to be swung by manipulation, and the other end portion of the second link for releasing the engagement between the engaged portion and the engaging portion, i.e., the engagement for maintaining the swingable member in the engagement position, moves to an advanced position enabling the engagement release manipulation, in response to the swinging movement of the swingable member from the housing position toward the engagement position. Therefore, it is unnecessary to manipulate the stopper from inside the bag as explained with respect to the prior art stopper, and the stopper is easy to manipulate.

Furthermore, when the swingable member is in the housing position, the other end portion of the second link is disposed at a retracted position and hidden by the base. Therefore, when the swingable member is swung by manipulation from the housing position to the engagement position, the other end portion of the second link is unlikely to be accidentally manipulated, thus providing the stopper with good manipulatability.

In the stopper for preventing movement of a bag equipped with casters, the other end portion of the swingable member is preferably provided with a rubber engaging member on the ground-contact surface thereof to be engaged with the ground.

With such a construction, the frictional resistance between the other end portion of the swingable member and the ground can be increased, thus enhancing the effect of preventing movement of a bag equipped with casters.

The stopper for preventing movement of a bag equipped with casters is preferably further provided with a first biasing member which biases the swingable member from the engagement position toward the housing position so as to move the swingable member to the housing position and maintain the swingable member in that position when the engagement is released.

With such a construction, when the engagement between the engaging member and the engaged member is released by manipulation, the swingable member automatically moves to the housing position, thus further facilitating the manipulation of the stopper.

The stopper for preventing movement of a bag equipped with casters is preferably further provided with a second biasing member which biases the engaging portion toward the engaged portion so as to move the engaging portion swingably around one end portion of the second link and engage the engaged portion with the engaging portion.

With such a construction, when the swingable member moves to the engagement position, the engaged portion of the base is automatically engaged with the engaging portion of the second link, thereby automatically maintaining the swingable member in the engagement position. By simply moving the second link against the biasing force of the second biasing member, the swingable member can be released from the engagement position, thus further facilitating the manipulation of the stopper.

In the above construction, the swingable member is preferably further provided with a housing portion in which the first and second links are housed when the swingable member is in the housing position.

With such a construction, a more space-saving and well designed stopper for preventing movement of a bag equipped with casters can be provided.

Furthermore, a bag equipped with casters according to the present invention is provided to solve the above problems. A main feature of the bag equipped with casters according to the present invention is that the bag is provided with the above-described stopper.

The stopper for preventing movement of a bag equipped with casters according to the present invention does not to reduce the storage space of the bag equipped with casters. The stopper of the invention is easy to manipulate, and allows the bag to smoothly move when desired.

BEST MODE FOR CARRYING OUT THE INVENTION

Figure 1:
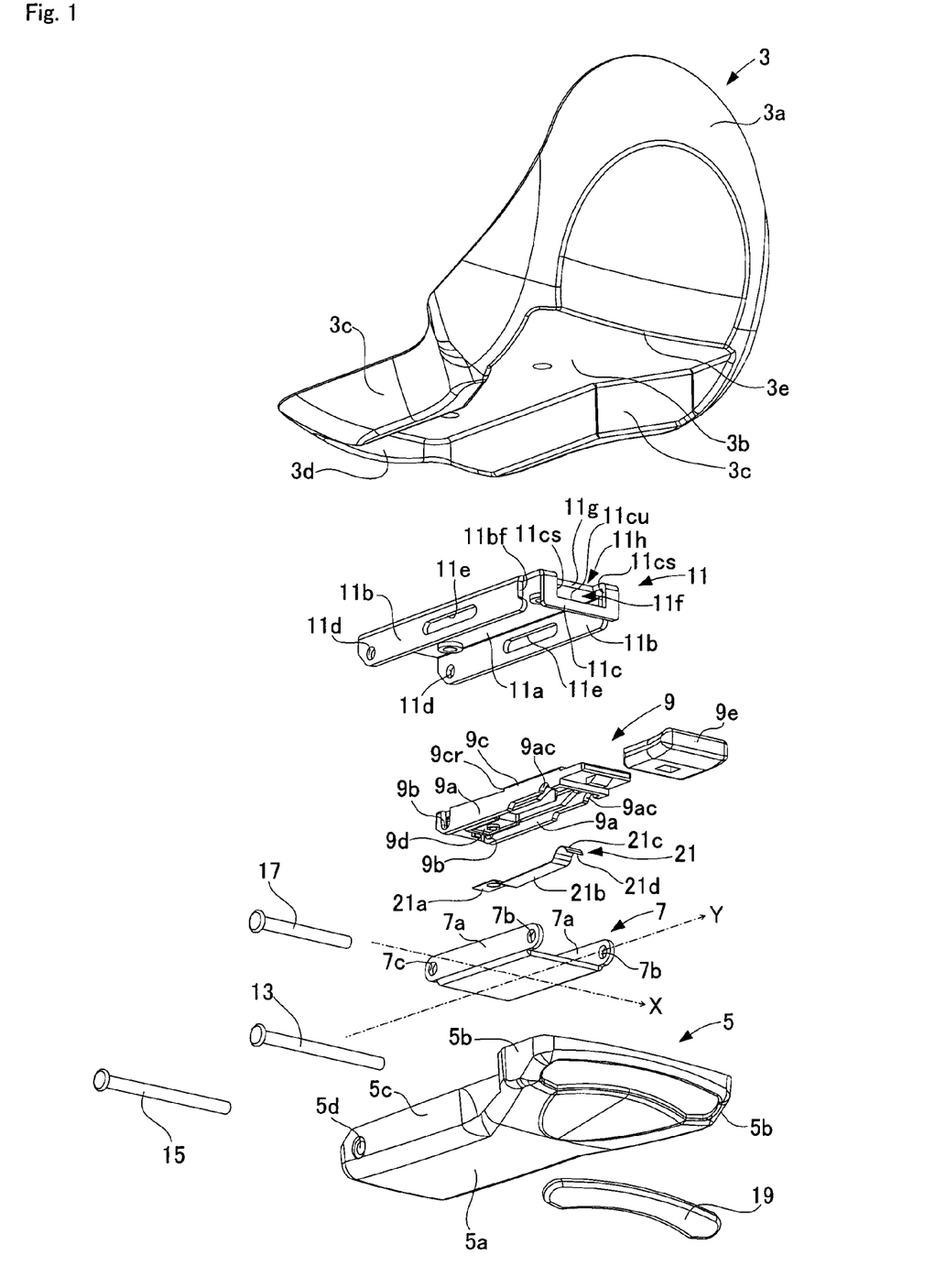
FIG. 1 is an exploded perspective view of a stopper for preventing movement according to one embodiment of the present invention.
Figure 2:
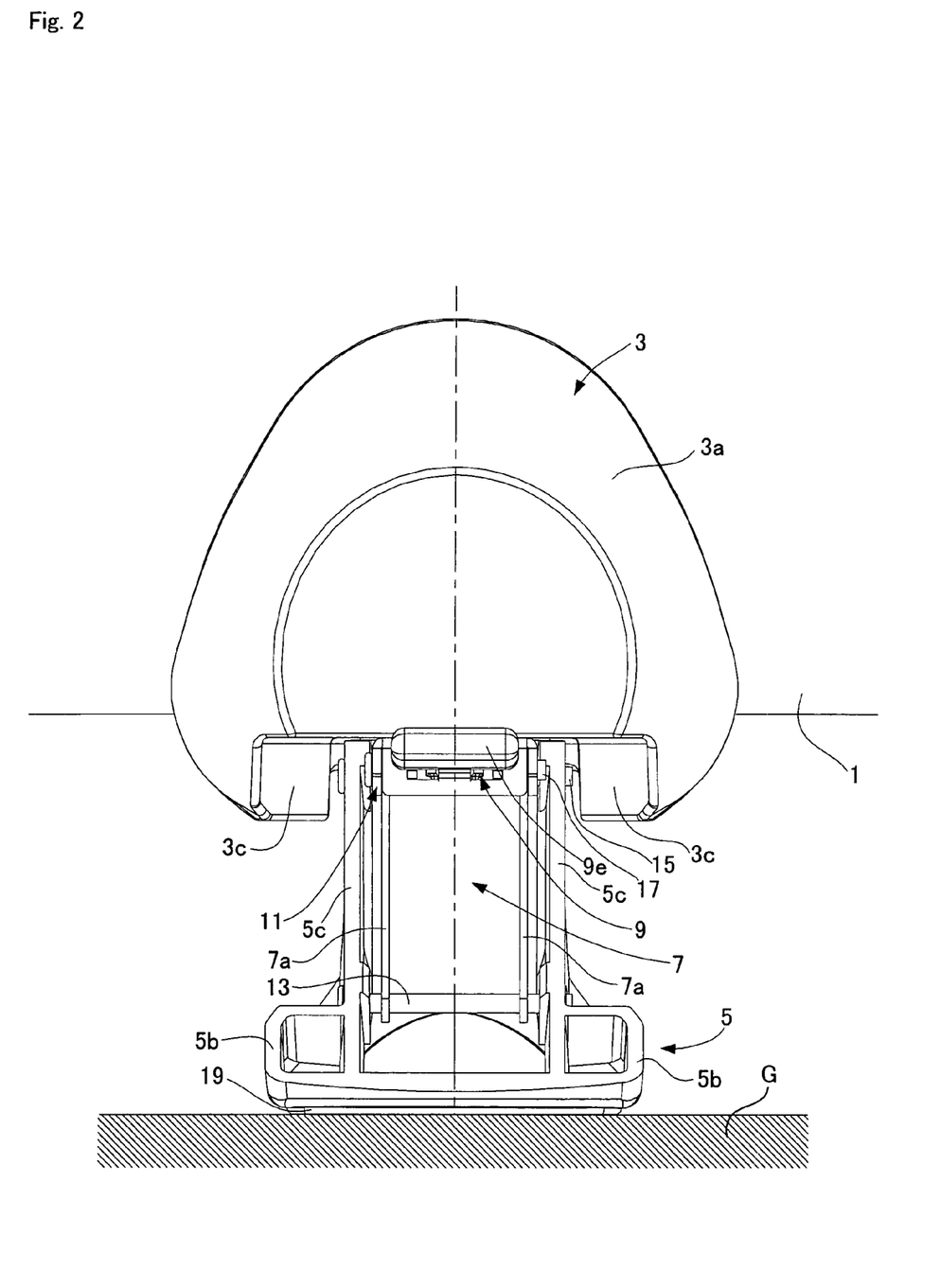
FIG. 2 is a front view of the assembly of the stopper of FIG. 1.
Figure 3:
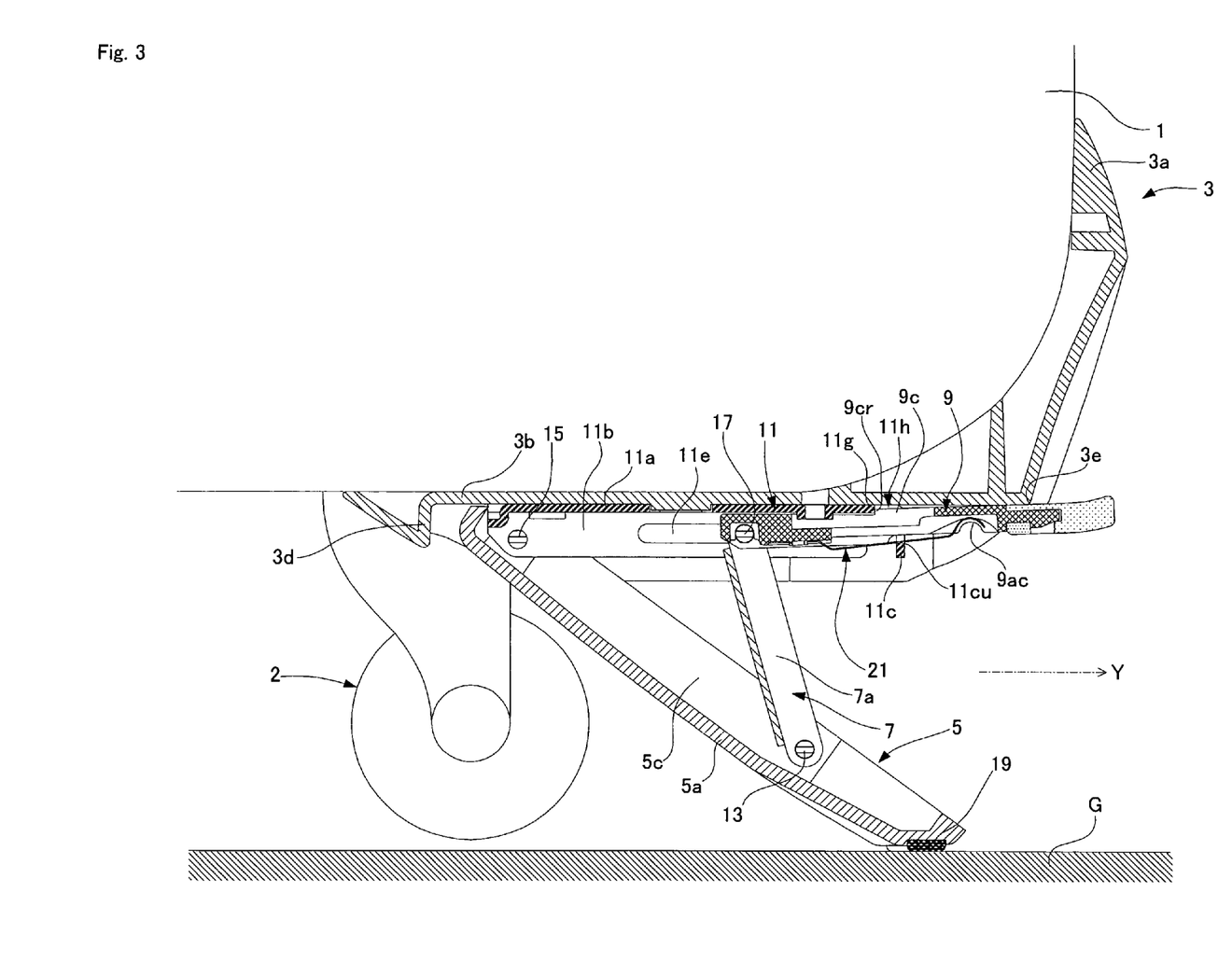
FIG. 3 is a longitudinal sectional view of the stopper of FIG. 2.
Figure 4:
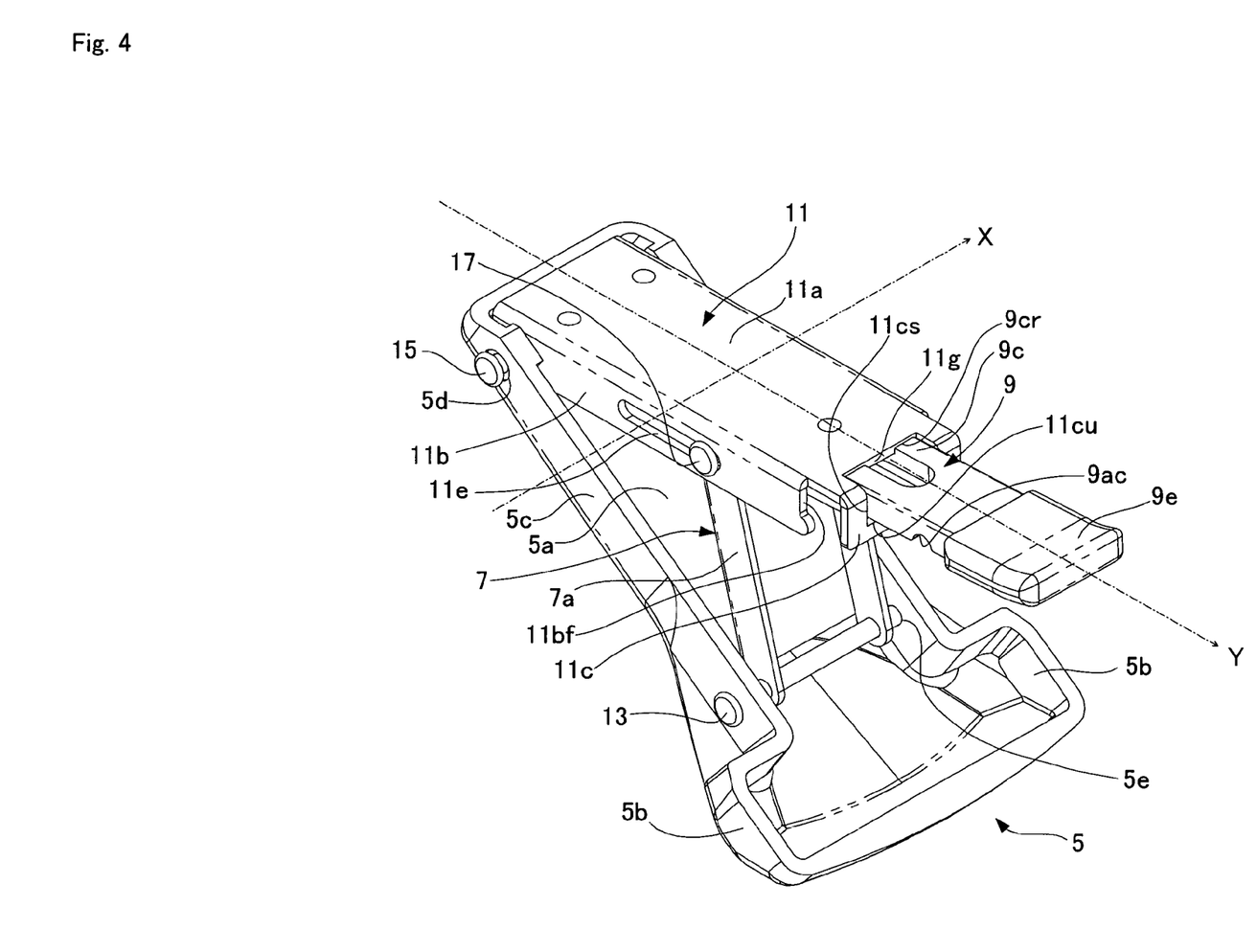
FIG. 4 is a perspective view of the essential parts of the stopper of FIG. 2.
Figure 5:
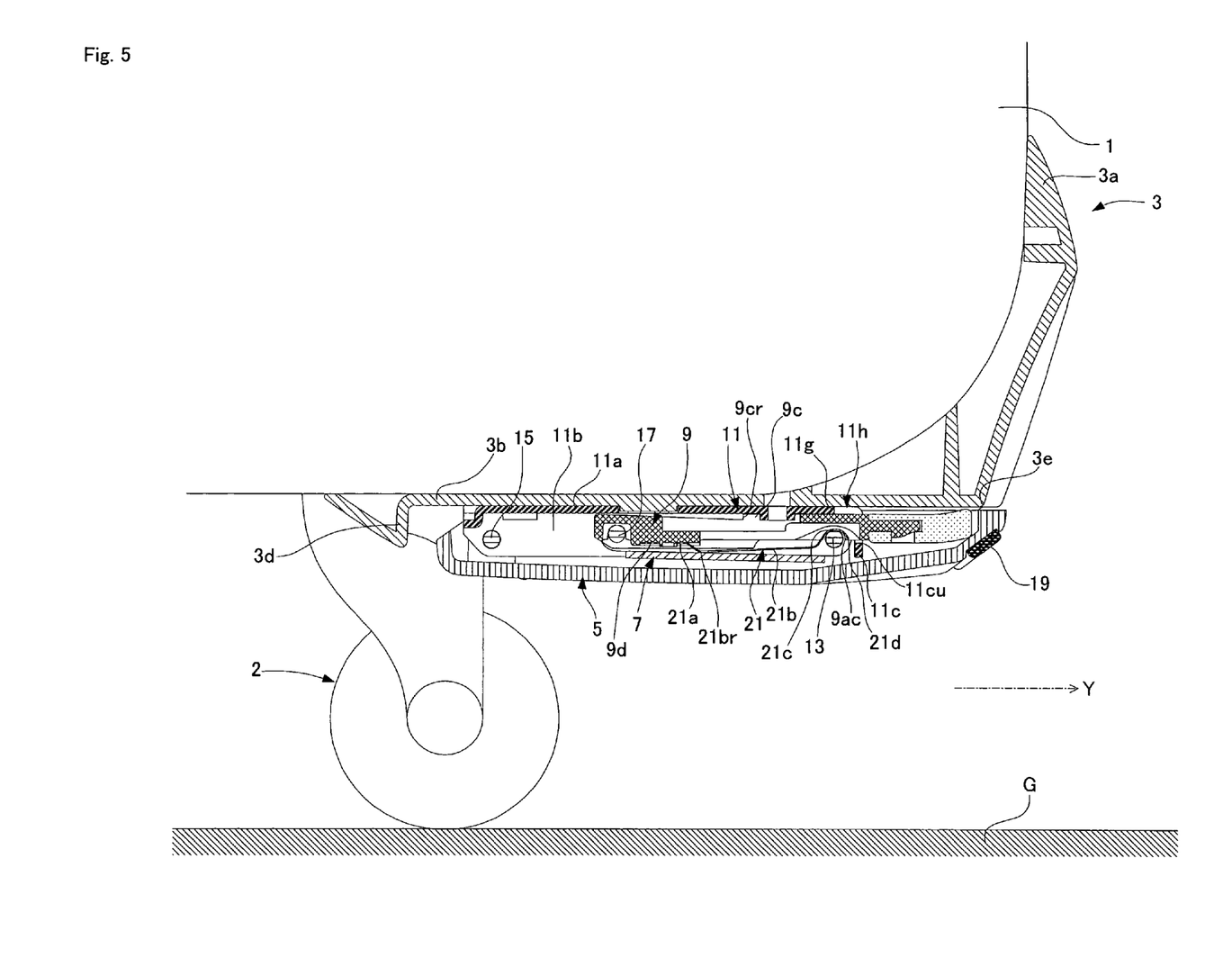
FIG. 5 is a longitudinal sectional view of the housed state of the stopper of FIG. 2.

A preferable embodiment of the stopper for preventing movement of a bag equipped with casters according to the present invention is described below with reference to the attached drawings. FIG. 1 is a perspective view of a disassembled stopper for preventing movement according to one embodiment of the present invention. FIG. 2 is a front view of the assembly of the stopper of FIG. 1. FIG. 3 is a longitudinal sectional view of the stopper of FIG. 2. FIG. 4 is a perspective view of the essential parts of the stopper of FIG. 2. FIG. 5 is a longitudinal sectional view of the housed state of the stopper of FIG. 2. In the description hereinafter, the X direction in FIGS. 1 and 4 is referred to as "right", and the Y direction of FIGS. 3 to 5 as "front".

As shown in FIGS. 1 to 4, the stopper for preventing movement of a bag equipped with casters according to this embodiment comprises: a base 3 mounted on the bottom surface of the bag 1 with casters 2; a swingable member 5, the rear end (one end) portion of which is rotatably connected to the base 3 and the front end (the other end) portion of which is engaged with the ground G to prevent movement of the bag 1 equipped with casters; a first link 7 and second link 9 for maintaining the front end portion of the swingable member 5 in engagement with the ground G.

As shown in FIG. 3, the base 3 is generally L-shaped in cross section and comprises: a plate-like side wall portion 3a extending in the up-down direction along the side surface of the bag 1; and a plate-like bottom wall portion 3b extending in the front-rear direction along the bottom surface of the bag 1. While the side wall portion 3a is in contact with the side surface of the bag 1, the bottom wall portion 3b and a guide plate 11 as described below are secured by screws (not shown) to the bottom surface of the bag 1, thereby fixing the base 3. As shown in FIGS. 1 to 3, the bottom wall portion 3b has right and left projection walls 3c, 3c and a rear projection wall 3d projecting downward along the right and left edges and rear edge, respectively. When the swingable member 5 is in the housing position as described below, the swingable member 5 is housed inside these walls.

As shown in FIG. 1, the guide plate 11 comprises: a rectangular base portion 11a extending in the front-rear direction along the bottom surface of the base 3; a pair of right and left standing walls 11b, 11b extending downward along the right and left edges of the base portion 11a; and a front standing wall 11c extending downward along the front edge of the base 11a. When the swingable member 5 is in the housing position as described below and shown in FIG. 5, the first link 7 is housed inside the right and left standing walls 11b, 11b and front standing wall 11c. The front edges 11bf, 11bf of the right and left standing walls 11b, 11b are disposed at a distance from the front standing wall 11c. When the swingable member 5 is disposed as shown in FIG. 5, an insertion shaft 13 as described below and shown in FIG. 1 is disposed between the walls.

As shown in FIG. 1, a pair of through holes 11d, 11d are provided in the rear end portions of the right and left standing walls 11b, 11b, respectively, and an insertion shaft 15 as described below and shown in FIG. 1 is inserted therethrough. A pair of oblong holes 11e, 11e extending in the front-rear direction are provided in the center portions of the right and left standing walls 11b, 11b, respectively, and a slide shaft 17 as shown in FIG. 1 is inserted therethrough.

As shown in FIG. 1, the front edge of the base portion 11a is cut to form a rectangular notch, and the upper edge of the front standing wall 11c is also cut to form a rectangular notch, thereby forming an opening 11f having an L-shape cross-section in the center portion of the corner formed by the base portion 11a and the front standing wall 11c. As shown in FIG. 4, a second link 9 as described below is inserted through the opening 11f of the front standing wall 11c so as to restrict downward, rightward and leftward movements of the second link 9 by the inner upper edge 11cu and inner right and left edges 11cs, 11cs of the front standing wall 11c. A front edge 11g (engaged portion) obtained by cutting the base portion 11a to form a rectangular notch is engaged with a rear edge 9cr (engaging portion) of a projection 9c formed on the second link 9 as described below. Although the guide plate 11 is formed separately from the base 3 in this embodiment, these components may be formed as one integral unit.

As shown in FIGS. 2 to 4, the swingable member 5 is in the form of a flat plate, and the rear end (one end) portion of the swingable member 5 is rotatably attached to the base 3, and the front end (the other end) portion thereof is configured to swing between an engagement position for engagement with the ground G and a housing position close to the bottom surface of the base 3. More specifically, as shown in FIGS. 1 to 4, the swingable member 5 comprises a body portion 5a which is rectangular in plain view, and extension portions 5b, 5b extending from the front end portion of the body portion 5a in the right and left directions. The body portion 5a has a pair of right and left standing walls 5c, 5c extending upward along the right and left edges. When the swingable member 5 is disposed in the housing position as shown in FIG. 5, the guide plate 11, first link 7, second link 9, and a release manipulation portion 9e as described below are housed inside the right and left standing walls 5c, 5c. A pair of through holes 5d, 5d are provided in the rear end portion of the right and left standing walls 5c, 5c, respectively. While the right and left standing walls 5c, 5c of the swingable member 5 are disposed outside the right and left standing walls 11b, 11b of the guide plate 7, an insertion shaft 15 as shown in FIG. 1 is inserted through the through holes 5d, 5d of the right and left standing walls 5c, 5c and through holes 11d, 11d of the guide plate 11, whereby the swingable member 5 is secured to the guide plate 11 swingably around the insertion shaft 15. The insertion shaft 15 is inserted into a torsion coiled spring (a first biasing member, not shown). One end of the torsion coiled spring pushes the base 3 and the opposite end thereof pushes the swingable member 5 to thereby bias the swingable member 5 from the engagement position as shown in FIG. 3 toward the housing position as shown in FIG. 5. In the housing position, as shown in FIG. 5, the front end portion of the swingable member 5 projects from the front edge 3e of the bottom wall portion 3b of the base 3. The swingable member 5 can be swung by pressing the projecting front end portion downward.

As shown in FIG. 4, a pair of through holes 5e, 5e are also provided at a position slightly toward the front edge from the center of the right and left standing walls 5c, 5c, respectively, and an insertion shaft 13 is inserted into the through holes 5e, 5e.

As shown in FIGS. 1 to 3, an engagement member 19 made of rubber is attached to the ground contact surface of the front end portion and extension portions 5b, 5b of the body portion 5a to be engaged with the ground G. The front end portion of the swingable member 5 is engaged with the ground G via the engagement member 19. According to this embodiment, as shown in FIG. 3, when the front end portion of the swingable member 5 is engaged with the ground G and maintained in the engagement position as described below, the caster 2 provided on the bottom surface of the bag 1 is raised from the ground G.

As shown in FIG. 1, the first link 7 is rectangular in plain view and has right and left standing walls 7a, 7a extending upward along the right and left edges. A pair of through holes 7b, 7b are provided in the front end (one end) portion of the right and left standing walls 7a, 7a, and a pair of through holes 7c, 7c in the rear end (the other end) portion thereof, respectively, so that each end portion has a pair of through holes. As shown in FIGS. 2 to 4, while the right and left standing walls 7a, 7a of the first link 7 are disposed inside the right and left standing walls 5c, 5c of the swingable member 5, an insertion shaft 13 is inserted through the through holes 7b, 7b of the front end portion and through holes 5e, 5e of the swingable member 5, whereby the front end portion of the first link 7 is connected rotatably around the insertion shaft 13. While the right and left standing walls 7a, 7a of the first link 7 are disposed inside the right and left standing walls 11b, 11bc of the guide plate 11, a slide shaft 17 as shown in FIG. 1 is inserted through the through holes 7c, 7c of the rear end portion and through the oblong holes 11e, 11e of the guide plate 11, whereby the rear end portion of the first link 7 is connected rotatably around the slide shaft 17 and connected slidably along the oblong holes 11e, 11e of the guide plate 11. With such a construction, the rear end portion of the first link 7 slides in response to the swinging movement of the swingable member 5, and the first link 7 swings. When the swingable member 5 is disposed in the housing position, the first link 7 is housed inside the right and left standing walls 11b, 11b and front standing wall 11c of the guide plate 11, and the rear region of the second link 9 is housed inside the right and left standing walls 7a, 7a of the first link 7.

As shown in FIG. 1, the second link 9 is rectangular in plain view and has right and left standing walls 9a, 9a extending downward along the right and left edges. A pair of through holes 9b, 9b are provided in the rear end (one end) portion of the right and left standing walls 9a, 9a, respectively. As shown in FIGS. 2 to 4, while the right and left standing walls 9a, 9a of the second link 9 are disposed inside the right and left standing walls 7a, 7a of the first link 7, a slide shaft 17 is inserted through the through holes 9b, 9b of the second link 9 and through the through holes 7c, 7c of the rear end portion of the first link 7, whereby the rear end portion of the second link 9 is rotatably connected to the rear end portion of the first link 7. Further, the front end portion of the second link 9 is inserted through the opening of the front standing wall 11c. Therefore, the second link 9 slides with the rear end portion of the first link 7 along the bottom surface of the guide plate 11 in response to the swinging movement of the swingable member 5. The right and left standing walls 9a, 9a have notches 9ac, 9ac in the front end portion thereof, so that when the swingable member 5 is in the housing position as shown in FIG. 5, the insertion shaft 13 disposed between the front edges 11bf, 11bf of the right and left standing walls 11b, 11b of the guide plate 11 and the front standing wall 11c of the guide plate 11 slips into the notches 9ac, 9ac.

As shown in FIG. 1, a projection portion 9C is provided in a position near the center in the front-rear direction on the upper surface of the second link 9. The projection 9c is advanced forward in response to the swinging movement of the swingable member 5 from the housing position toward the engagement position. When the swingable member 5 has reached the engagement position, the rear edge 9cr of the projection 9c is positioned forward of the front edge 11g of the guide plate 11. The projection 9c is swung upward around the slide shaft 17 by an upward biasing force of a leaf spring 21 as described below and inserted into the cut portion 11h of the base portion 11a of the guide plate 11. Therefore, when the swingable member 5 tries to swing toward the housing position, the rear edge 9cr of the projection 9c is engaged with the front edge 11g of the guide plate 11 to thereby restrict the movements of the second link 9 and first link 7, thus maintaining the swingable member 5 in the engagement position, as shown in FIGS. 3 and 4.

As shown in FIG. 3, a leaf spring 21 (a second biasing member) for biasing the second link 9 upward is attached to the lower surface of the second link 9. More specifically, as shown in FIG. 1, the leaf spring 21 is in the form of a strip extending in the front-rear direction and is composed of: an attachment portion 21a formed in the rear end portion; a body portion 21b extending from the rear end portion toward the front end portion; and a pressing portion 21 formed in the front end portion. The attachment portion 21a is secured to a leaf-spring-fixing portion 9d provided in the rear end portion of the second link 9. When the swingable member 5 is in the housing position as shown in FIG. 5, the body portion 21b is inclined upward toward the front end portion of the second link 9, whereas the tip 21d of the pressing portion 21c is positioned higher than the inner upper edge 11cu of the guide plate 11 at a position rearward of the front standing wall 11c of the guide plate 11, and the rear edge 21br of the body portion 21b is positioned lower than the inner upper edge 11cu of the guide plate 11. With such a construction, when the leaf spring 21 is advanced in response to the swinging movement of the swingable member 5 from the housing position toward the engagement position, the body portion 21b of the leaf spring 21 is brought into contact with the inner upper edge 11cu of the front standing wall 11c of the guide plate 11 to push the pressing portion 21c upward and thereby press the second link 9.

As shown in FIGS. 1 to 4, a release manipulation portion 9e for releasing the engagement between the front edge 11g (engaged portion) of the guide plate 11 and the rear edge 9cr (engaging portion) of the projection 9c of the second link 9 is provided in the front end (the other end) portion of the second link 9. The release manipulation portion 9e moves in response to a swinging movement of the swingable member 5. When the swingable member 5 is in the engagement position as shown in FIG. 3, the release manipulation portion 9e projects from the front edge 3e of the base 3 and is positioned in an advanced position enabling the engagement release manipulation. When the release manipulation portion 9e is pressed downward in the advanced position, the rear edge 9cr of the projection 9c of the second link 9 is moved downward, and its engagement with the front edge 11g of the guide plate 11 is released. When the engagement is released, the swingable member 5 is biased toward the housing position by a torsion coiled spring (not shown) as described above, whereby the swingable member 5 swings to the housing position. In response to this swinging movement, the release manipulation portion 9e moves to a retracted position. When the swingable member 5 is in the housing position as shown in FIG. 5, the release manipulation portion 9e is positioned in the retracted position where the release manipulation portion 9e does not project from the front edge 3e of the bottom wall portion 3b but is hidden by the base 3, and is housed inside the right and left standing walls 5c, 5c of the swingable member 5. Although the release manipulation member 9c is formed separately from the second link 9 in this embodiment, these components may be formed as one integral unit.

Next, the method for using the thus constructed stopper for preventing movement of a bag equipped with casters is described below.

When the bag 1 with casters is to be secured in the desired position so as not to move, the bag 1 is lifted up to raise the casters 2 from the ground G. Subsequently, the front end portion of the swingable member 5 projecting from the front edge 3e of the base 3 is pressed downward to swing the swingable member 5 from the housing position as shown in FIG. 5 and thereby advance the second link 9 forward. As shown in FIGS. 2 and 3, when the swing manipulation is completed to dispose the swingable member 5 in the engagement position, the rear edge 9cr of the projection 9c of the second link 9 is engaged with the front edge 11g of the guide plate 11, thereby maintaining the engaging member 19 of the front edge portion of the swingable member 5 in engagement with the ground G, so that the bag 1 with casters can be secured in the desired position so as not to move.

Subsequently, when the bag 1 with casters is to be moved, a release manipulation portion 9e of the second link 9 projecting from the front edge 3e of the base 3 as shown in FIGS. 2 and 3 is pressed downward to thereby release the engagement between the second link 9 and the guide plate 11. When the engagement is released, the swingable member 5 biased toward the housing position automatically swings to the housing position as shown in FIG. 5 and remains in that position. When the swingable member 5 is in the housing position, the guide plate 11, first link 7, second link 9, and release manipulation portion 9e are housed inside the swingable member 5, and the swingable member 5 is disposed along the bottom surface of the base 3, as shown in FIG. 5.

As described above, according to this embodiment, because the mechanisms for maintaining the swingable member 5 in the engagement position and releasing the swingable member 5 from the engagement are housed inside the plate-like swingable member 5, the amount of projection of the stopper from the bottom of the bag 1 is small. Therefore, even if there is a projection or the like on the ground, the stopper is less likely to collide with such a projection, so that the bag can be moved smoothly.

By simply pressing downward the front edge portion of the swingable member 5 projecting from the front edge 3e of the base 3 to cause the swingable member 5 to swing to the engagement position, the swingable member 5 is automatically retained in the engagement position. Likewise, by simply pressing downward the release manipulation portion 9e projecting from the front edge 3e of the base 3, the swingable member 5 is released from the engagement position, and the swingable member 5 automatically swings to the housing position and is maintained in that position. Therefore, the stopper is easy to manipulate.

Furthermore, only when the swingable member 5 is in the engagement position, the release manipulation portion 9e projects from the front edge 3e of the base 3 and is located in the position enabling the release manipulation. Therefore, the release manipulation portion 9e is unlikely to be accidentally manipulated when the swingable member 5 is to be swung to the engagement position, thus providing the stopper with good operability.

While only a preferred embodiment of the present invention has been presented and described in detail, the invention is not limited thereto or thereby. Various modifications and variations may be made without departing from the scope or spirit of the invention. In the above embodiment, as shown in FIG. 3, when the front edge portion of the swingable member 5 is engaged with the ground G and maintained in the engagement position, the casters 2 are raised from the ground G. However, the present invention is not limited thereto, and any configuration that can create a frictional resistance between the engagement member 15 and the ground G may be used. For example, when the engagement member 19 is brought into contact with the ground and elastically deforms, the casters 2 may be in contact with the ground.

The material of the engagement member 19 is not limited to rubber, and other materials such as elastic resins, resins with a coarse surface may be used. Alternatively, the front edge portion of the swingable member 5 may be directly engaged with the ground G, without providing the engagement member 19.

The invention claimed is:

1. A stopper for preventing movement of a bag equipped with casters comprising:
   a base mounted on the bottom surface of the bag;
   a swingable member having one end portion rotatably connected to the base, and having the other end portion capable of being manipulated so as to swing the swingable member between a housing position where the other end portion is positioned close to the base and an engagement position for engaging the other end portion with the ground;
   a first link having one end portion rotatably connected to the swingable member, and having the other end portion rotatably and slidably connected to the base and slidable along the bottom surface of the base in response to the swinging movement of the swingable member; and
   a second link having one end portion rotatably connected to the other end portion of the first link, and constructed so as to be slidable with the other end portion of the first link along the bottom surface of the base, the second link having an engaging portion;
   the base having an engaged portion to be engaged with the engaging portion to thereby maintain the swingable member in the engagement position;
   the other end portion of the second link being manipulatable to release the engagement between the engaging portion and the engaged portion and being disposed in an advanced position enabling an engagement release manipulation when the swingable member is in the engagement position; and
   when the swingable member is in the housing position, the other end portion of the second link being disposed in a retracted position so as to be hidden by the base, and the swingable member and the first link being disposed along the bottom surface of the base.

2. The stopper according to claim 1 wherein the other end portion of the swingable member is provided with a rubber engagement member on a ground contact surface thereof to be engaged with the ground.

3. The stopper according to claim 1 further comprising a second biasing member which biases the engaging portion toward the engaged portion so as to move the engaging portion swingably around the one end portion of the second link and engage the engaged portion with the engaging portion.

4. The stopper according to claim 1 further wherein the swingable member comprises a housing portion in which the first link and second link are housed when the swingable member is in the housing position.

5. A bag equipped with casters comprising the stopper of claim 1.

* * * * *